(12) United States Patent
Kwon et al.

(10) Patent No.: US 11,161,779 B2
(45) Date of Patent: Nov. 2, 2021

(54) FUNCTIONAL BUILDING MATERIAL FOR WINDOWS

(71) Applicant: LG Hausys, Ltd., Seoul (KR)

(72) Inventors: Dae-Hoon Kwon, Anyang-si (KR); Youn-Ki Jun, Gwacheon-si (KR); Sung-Jin Park, Incheon (KR); Hyun-Woo You, Incheon (KR); Young-Woo Choi, Anyang-si (KR)

(73) Assignee: LG HAUSYS, LTD., Seoul (KR)

( * ) Notice: Subject to any disclaimer, the term of this patent is extended or adjusted under 35 U.S.C. 154(b) by 10 days.

(21) Appl. No.: 16/327,203

(22) PCT Filed: Dec. 9, 2016

(86) PCT No.: PCT/KR2016/014413
§ 371 (c)(1),
(2) Date: Feb. 21, 2019

(87) PCT Pub. No.: WO2018/038329
PCT Pub. Date: Mar. 1, 2018

(65) Prior Publication Data
US 2019/0185374 A1 Jun. 20, 2019

(30) Foreign Application Priority Data
Aug. 23, 2016 (KR) .......................... 10-2016-0107245

(51) Int. Cl.
*B32B 15/04* (2006.01)
*C03C 17/36* (2006.01)
(Continued)

(52) U.S. Cl.
CPC ............ *C03C 17/366* (2013.01); *C03C 17/36* (2013.01); *C03C 17/3618* (2013.01);
(Continued)

(58) Field of Classification Search
CPC ... C03C 17/36; C03C 17/366; C03C 17/3644; C03C 17/3652; C03C 17/3618;
(Continued)

(56) References Cited

U.S. PATENT DOCUMENTS 10,378,271 B2 * 8/2019 Knoll ...................... C03C 17/36
2007/0281171 A1 12/2007 Coster et al.
(Continued)

FOREIGN PATENT DOCUMENTS

JP 2001173169 A 6/2001
JP 2010500270 A 1/2010
(Continued)

OTHER PUBLICATIONS

Guardian Float glass, 2020.*
(Continued)

*Primary Examiner* — Lauren R Colgan
(74) *Attorney, Agent, or Firm* — Hauptman Ham, LLP

(57) ABSTRACT

Provided is a matte gray functional building material for windows, comprising: a transparent glass substrate; and a low-emissivity coating formed on one surface of the transparent glass substrate.

13 Claims, 2 Drawing Sheets

(51) Int. Cl.
- *E06B 3/54* (2006.01)
- *H01B 3/10* (2006.01)
- *E06B 9/24* (2006.01)
- *G02B 5/20* (2006.01)
- *H01B 1/02* (2006.01)
- *H01B 1/08* (2006.01)

(52) U.S. Cl.
CPC ...... *C03C 17/3626* (2013.01); *C03C 17/3642* (2013.01); *C03C 17/3644* (2013.01); *C03C 17/3649* (2013.01); *C03C 17/3681* (2013.01); *E06B 3/54* (2013.01); *E06B 9/24* (2013.01); *G02B 5/208* (2013.01); *H01B 3/10* (2013.01); *C03C 2218/156* (2013.01); *H01B 1/02* (2013.01); *H01B 1/08* (2013.01)

(58) Field of Classification Search
CPC ............ C03C 17/3626; C03C 17/3639; C03C 17/3681; C03C 17/3613; C03C 17/3435; C03C 17/3615; C03C 17/3642; C03C 17/361; C03C 17/3607; C03C 17/3657; C03C 2217/256; Y10T 428/12896; Y10T 428/12493; B32B 17/10174; B32B 17/10229; B32B 15/04
USPC .................. 428/426, 428, 432, 434, 688
See application file for complete search history.

(56) References Cited

U.S. PATENT DOCUMENTS

| | | | |
|---|---|---|---|
| 2009/0047466 A1 | 2/2009 | German et al. | |
| 2010/0178492 A1* | 7/2010 | Schicht | C23C 14/086 428/336 |
| 2011/0261442 A1* | 10/2011 | Knoll | C03C 17/3626 359/360 |
| 2011/0262726 A1* | 10/2011 | Knoll | C03C 17/36 428/213 |
| 2014/0072784 A1* | 3/2014 | Dietrich | C03C 17/3626 428/213 |
| 2014/0272395 A1 | 9/2014 | Ding et al. | |
| 2015/0079409 A1* | 3/2015 | Imran | C03C 17/3626 428/434 |
| 2015/0140355 A1 | 5/2015 | Suzuki et al. | |
| 2016/0244361 A1 | 8/2016 | Rondeau et al. | |

FOREIGN PATENT DOCUMENTS

| | | |
|---|---|---|
| JP | 2012043487 A | 3/2012 |
| JP | 2015532256 A | 11/2015 |
| KR | 1020100057442 A | 5/2010 |
| KR | 101386806 B1 | 4/2014 |
| KR | 101512167 B1 | 4/2015 |
| KR | 1020150132776 A | 11/2015 |
| KR | 1020160015513 A | 2/2016 |
| WO | 2014017448 A1 | 1/2014 |

OTHER PUBLICATIONS

International Search Report dated May 18, 2017, corresponding to International Application No. PCT/KR2016/014413 citing the above reference(s).

Japanese Office Action issued on Jan. 31, 2020, in connection with the Japanese Patent Application No. 2019-510815 citing the above reference(s).

* cited by examiner

FUNCTIONAL BUILDING MATERIAL FOR WINDOWS

CROSS REFERENCE TO RELATED APPLICATION

This present application is a national stage filing under 35 U.S.C § 371 of PCT application number PCT/KR2016/014413 filed on Dec. 9, 2016 which is based upon and claims the benefit of priority to Korean Patent Application No. 10-2016-0107245 filed on Aug. 23, 2016 in the Korean Intellectual Property Office. The disclosures of the above-listed applications are hereby incorporated by reference herein in their entirety.

TECHNICAL FIELD

The present invention relates to functional building materials for window.

BACKGROUND ART

A low-emissivity glass refers to a glass in which a low-emissivity layer containing a metal, such as a silver (Ag), having a high reflectivity in the infrared region is deposited as a thin film. This low-emissivity glass is a functional material that reflects radiant rays in the infrared region to shield outdoor solar radiation in summer and preserve indoor heating radiation in winter, thereby bring energy saving effect of the buildings.

In general, since a silver (Ag) used as a low-emissivity layer is oxidized when exposed to air, a dielectric layer is deposited as an oxidation-resistant membrane on the upper and lower portions of the low-emissivity layer. Such dielectric layer also serves to increase visible light transmittance.

DETAILED DESCRIPTION OF THE INVENTION

Technical Problem

One embodiment of the present invention provides a functional building material for window that implement matte gray.

Technical Solution

In one embodiment of the invention, provided is functional building materials for window having matte gray, comprising:
a transparent glass substrate, and a low-emissivity coating formed on one surface of the transparent glass substrate;
wherein the low-emissivity coating comprises a lower light-absorbing layer, a light-absorbing metal layer and a low-emissivity layer,
wherein the lower-light absorbing layer comprises a chromium nitride,
wherein the functional building materials for window has a color index a* value of −5 to 5 and a color index b*value of −5 to 5, which is measured using a colorimeter for visible light transmitting color,
wherein the other surface of the transparent glass substrate, on which the low-emissivity coating is not formed, has a color index a*value of −5 to 5 and a color index b*value of −5 to 5, which is measured using a colorimeter for reflected color,
wherein the functional building materials for window has a visible light transmittance of 20% to 60%, and
wherein another surface of the transparent glass substrate, on which the low-emissivity coating is not formed, has a visible light reflectivity of 1% to 15%.

Effect of the Invention

The functional building materials for window having matte gray are excellent in heat resistance, moisture resistance and abrasion resistance.

BEST MODE FOR CARRYING OUT THE INVENTION

Figure 1:
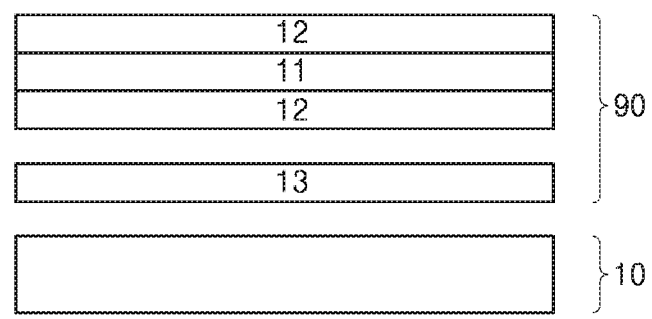
FIG. 1 is a schematic cross-sectional view of a functional building material for window in matte gray according to an embodiment of the present invention.

Hereinafter, exemplary embodiments of the present invention will be described in detail with reference to the accompanying drawings, which will be readily practiced to those skilled in the art to which the present invention pertains. The present invention may be embodied in many different forms and is not limited to the embodiments described herein.

In order to clearly illustrate the present invention, parts that are not related to the description are omitted, and the same or similar components are denoted by the same reference numerals throughout the specification.

In the drawings, the thicknesses are enlarged to clearly indicate various layers and regions. In the drawings, for the convenience of explanation, the thicknesses of some layers and regions are exaggerated.

Hereinafter, the formation of any structure in the "upper (or lower)" or the "up (or down)" of the substrate means that any structure is formed in contact with the upper surface (or lower surface) of the substrate. However, the present invention is not limited to not including other structures between the substrate and any structure formed on (or under) the substrate.

One embodiment of the invention provides a functional building material 100 for window having matte gray, comprising:
a transparent glass substrate 10, and a low-emissivity coating 90 formed on one surface of the transparent glass substrate 10;
wherein the low-emissivity coating 90 comprises a lower light-absorbing layer 13, a light-absorbing metal layer 12 and a low-emissivity layer 11,
wherein the lower-light absorbing layer 13 comprises a chromium nitride,
wherein the functional building materials for window has a color index a* value of about −5 to about 5 and a color index b*value of about −5 to about 5, which is measured using a colorimeter for visible light transmitting color,
wherein the other surface of the transparent glass substrate 10, on which the low-emissivity coating 90 is not formed, has a color index a*value of about −5 to about 5 and a color index b*value of about −5 to about 5, which is measured using a colorimeter for reflected color, wherein the functional building materials for window has a visible light transmittance of about 20% to about 60%, and wherein another surface of the transparent glass substrate 10, on which the low-emissivity coating 90 is not formed, has a visible light reflectivity of about 1% to about 15%.

The low-emissivity coating 90 may be formed with a thin film structure of multilayers based on a low-emissivity layer 11 that selectively reflects far-infrared rays among the solar radiant rays, as shown in FIG. 1, and can exhibit excellent heat insulating performance by Roy (Low-e; low emissivity) effect which results from the low emissivity characteristics of the low-emissivity coating 90.

The low-emissivity coating 90 may be a laminate of multilayer structures as described above, and be applied as a coating film of the transparent glass substrate 10. For example, it may be used as a functional building material for window such as window glass. The functional building material 100 for window is a functional material that reflects outdoor solar radiation in summer and preserves indoor heating radiation in winter to minimize a heat transfer between the indoor and outdoor areas, thereby saving energy consumption of the buildings.

The low-emissivity layer 11 means a layer having a low infrared emissivity. The emissivity refers to the rate at which an object absorbs, transmits, and reflects energy with a specific wavelength. The infrared emissivity indicates the degree of absorption of infrared energy in the infrared wavelength range. Specifically, the infrared emissivity refers to a ratio of the absorbed infrared energy to the applied infrared energy when a far-infrared ray corresponding to a wavelength range of about 5 µm to about 50 µm is applied, which shows a strong thermal action.

According to Kirchhoff's law, since the infrared energy absorbed by an object is equal to the infrared energy emitted by the object again, the absorption and emissivity of the object are the same as each other.

Further, since the infrared energy that is not absorbed is reflected from the surface of the object, the higher the reflectivity to the infrared energy of the object, the lower the emissivity. Numerically, it has a relation of (emissivity=1−infrared reflectivity).

Such emissivity can be measured by various methods commonly known in the art, and, for example, can be measured by a facility such as a Fourier transform infrared spectroscope (FT-IR) according to the KSL2514 standard.

The absorption rate, that is, the emissivity, of far-infrared rays exhibiting a strong heat action, as in an arbitrary object, for example, a low-emissivity glass, may have a very important meaning in measurement of the heating insulation performance.

The functional building material 100 for window is an energy-saving functional building material for window capable of maintaining a predetermined transmission characteristic in a visible light region to realize excellent light-emitting properties and capable of providing an excellent heating insulation effect by lowering the emissivity in the infrared region. Such functional building materials for window are also called to 'Roy Glass'.

The matte gray functional building material for window 100 implements gray defined by the color index values mentioned above, while satisfying the visible light transmittance and the visible light reflectivity to attain matte gray at the same time.

In one embodiment, the color index a*value of the matte gray functional building material for window, which is measured using a colorimeter for visible light transmitting color, may be about −5 to about 5, concretely about −3 to about 3, and the color index b*value may be about −5 to about 5, concretely about −3 to about 3.

In other embodiment, in the matte gray functional building material for window, the color index a*value measured using a colorimeter of the reflected color on the other surface of the transparent glass substrate, on which the low-emissivity coating is not formed, may be about −5 to about 5, specifically about −3 to about 3, and the color index b*value may be about −5 to about 5, specifically about −3 to about 3.

In another embodiment, in the matte gray functional building material for window, the visible light transmittance may be from about 20% to about 60%, and specifically from about 20% to about 50%.

In another embodiment, in the matte gray functionalized building material for window, the visible light reflectivity on the other surface of the transparent glass substrate, on which the low-emissivity coating is not formed, may be about 1% to about 15%, and specifically about 1% to about 7%.

Specifically, the low-emissivity coating 90 may be distinguished into a lower region 20, a low-emissivity region 30 and an upper dielectric region 40, and may be a structure of multiple layers in which the lower region 20, being in contact with one surface of the transparent glass substrate, is disposed by the low-emissivity region 30 and the upper dielectric region 40 sequentially.

Figure 2:
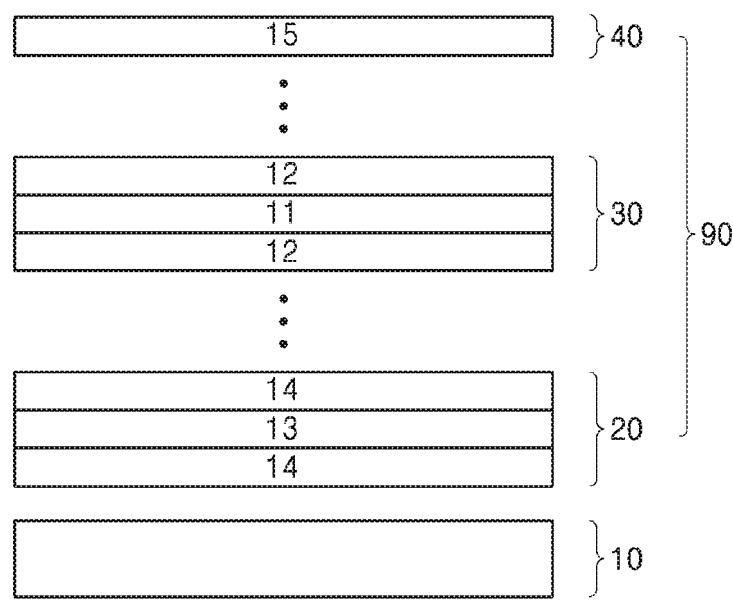
FIG. 2 is a schematic cross-sectional view of a functional building material for window in matte gray according to other embodiment of the present invention.

FIG. 2 is a cross-sectional view of a functional building material 200 for window in matte gray according to another embodiment of the present invention.

In one embodiment, the low-emissivity region 30 may include a low-emissivity layer 11 and a light-absorbing metal layer 12 laminated on both surfaces of the low-emissivity layer 11.

In other embodiment, the lower region 20 may include a lower light-absorbing layer 13 and a lower dielectric layer 14 laminated on both surfaces of the lower light-absorbing layer 13.

In another embodiment, the upper dielectric region 40 may include an upper dielectric layer 15.

The low-emissivity layer 11 is a layer formed of an electrically conductive material, e.g. a metal, which may have low emissivity, that is, it has a low sheet resistance, thereby having a low emissivity. For example, the low-emissivity layer (11) may have an emissivity of about 0.01 to about 0.3, specifically about 0.01 to about 0.2, more specifically about 0.01 to about 0.1, and yet more specifically from about 0.01 to about 0.08.

The low-emissivity layer 11 in the range of the above emissivity can achieve both excellent light-emitting property and heating insulation effect by appropriately adjusting the visible light transmittance and the infrared emissivity. The low-emissivity layer 11 having the above emissivity may have, for example, from about 0.78 Ω/sq to about 6.42 Ω/sq of a sheet resistance of the material forming a thin film, but is not limited thereto.

The low-emissivity layer 11 functions to selectively transmit and reflect solar radiant rays, and specifically has a low emissivity due to a high reflectivity to radiant rays in the infrared region. The low-emissivity layer 11 may include at least one selected from the group consisting of Ag, Au, Cu, Al, Pt, ion-doped metal oxides, and a combination thereof, and any metal known to be capable of implementing the low emissivity may be used without any limitation. The ion-doped metal oxide includes, for example, indium tin oxide (ITO), fluorine-doped tin oxide (FTO), Al-doped zinc oxide (AZO), gallium zinc oxide (GZO) and the like. In one embodiment, the low-emissivity layer 11 can be a layer formed of silver (Ag), so that the low-emissivity coating 90 can realize a high electrical conductivity, a low absorption rate in the visible light region, a durability, and the like.

The thickness of the low-emissivity layer 11 may be, for example, from about 5 nm to about 20 nm, and specifically from about 7 nm to about 15 nm. The low-emissivity layer 11 having the thickness in the above range is suitable for simultaneously realizing a low infrared emissivity and a high visible light transmittance.

The light-absorbing metal layer 12 is made of a metal having excellent light-absorbing ability to have function of adjusting sunlight, and can control the color realized by the low-emissivity coating 90 by means of adjusting material and thicknesses thereof.

In one embodiment, the light-absorbing metal layer 12 may have an extinction coefficient in the visible light range of about 1.5 to about 3.5. The extinction coefficient is a value derived from an optical constant, which is an inherent characteristic of the material concerned, wherein the optical constant is represented by the equation n–ik, where n which is the real number part represents a refractive index, and k which is the imaginary number part represents an extinction coefficient (also called to an absorption coefficient, a light-absorbing coefficient, a quenching coefficient, α). The extinction coefficient is a function of a wavelength (λ), and in the case of metals, the extinction coefficient is generally greater than zero. The extinction coefficient, k has the equation of α=(4πk)/λ in relation to the absorption coefficient, α. The absorption coefficient, α, is given by I=I0exp(−αd) when the thickness of a medium through which light passes is d. The intensity (I) of light passing through due to the absorption of light by the medium is reduced as compared with the intensity (I0) of incident light.

The light-absorbing metal layer 12 absorbs a certain portion of the visible light rays using the metal having the extinction coefficient of the visible light area in the above range so that the low-emissivity coating 90 has a predetermined color.

For example, the light-absorbing metal layer 12 may include at least one selected from the group comprising Ni, Cr, an alloy of Ni and Cr, and a combination thereof, but is not limited thereto.

The light-absorbing metal layer 12 may be included as a single layer or a plurality of layers, and may be located on one surface or both surfaces of the low-emissivity layer 11. FIG. 1 shows a case where the light-absorbing metal layer 12 is formed with a plurality of the layers on both surfaces of the low-emissivity layer 11.

The thickness of the light-absorbing metal layer 12 may be, for example, about 0.5 nm to about 10 nm, and specifically about 0.5 nm to about 5 nm, and may be suitably changed depending on the use purpose thereof without being limited thereto. The light-absorbing metal layer 12 is formed within the above thickness range, and thus is suitable for adjusting the light-absorbing metal layer 12 to have a predetermined transmittance and reflectivity.

The functional building materials 100 & 200 for window may implement gray for having the color index values described above. The functional building materials for window 100 & 200 can attain a perfect gray color by lowering the light transmittance and also realize matte gray by lowering the light reflectivity together.

The lower region 20 includes the lower-light absorbing layer 13 containing a chromium nitride. The lower-light absorbing layer 13 can increase a light absorption rate to realize the gray color defined by the above color index values.

The thickness of the lower-light absorbing layer 13 may be about 1 nm to about 15 nm, and specifically about 3 nm to about 10 nm. The lower-light absorbing layer 13 having the thickness in the above range is easy to realize a predetermined gray.

The lower region 20 may include a lower-light absorbing layer 13 and a lower dielectric layer 14 laminated on both surfaces of the lower-light absorbing layer 13.

The lower dielectric layer 14 may include at least one selected from the group comprising a metal oxide, a metal nitride, a metal oxynitride, and combinations thereof, and may be prepared from materials in which at least one of the components defined above is doped with at least one component selected from the group consisting of bismuth (Bi), boron (B), aluminum (Al), silicon (Si), magnesium (Mg), antimony (Sb), beryllium (Be), and a combination thereof.

The lower dielectric layer 14 can more easily realize the predetermined gray of the functional building materials 100 & 200 for window by selecting a material having a high light absorption rate. If the light absorption rate of the lower dielectric layer 14 is high, the light reflectivity can be relatively lowered, and thus it is also suitable to realize a matte.

In one embodiment, the thickness of the lower dielectric layer 14 may be from about 10 nm to about 40 nm. The lower dielectric layer 14 having a thickness in the above range is easy to realize a predetermined gray.

The low-emissivity coating 90 may include one to three of low-emissivity regions 30 and an intermediate dielectric region 50 may be interposed between the low-emissivity regions 30.

Figure 3:
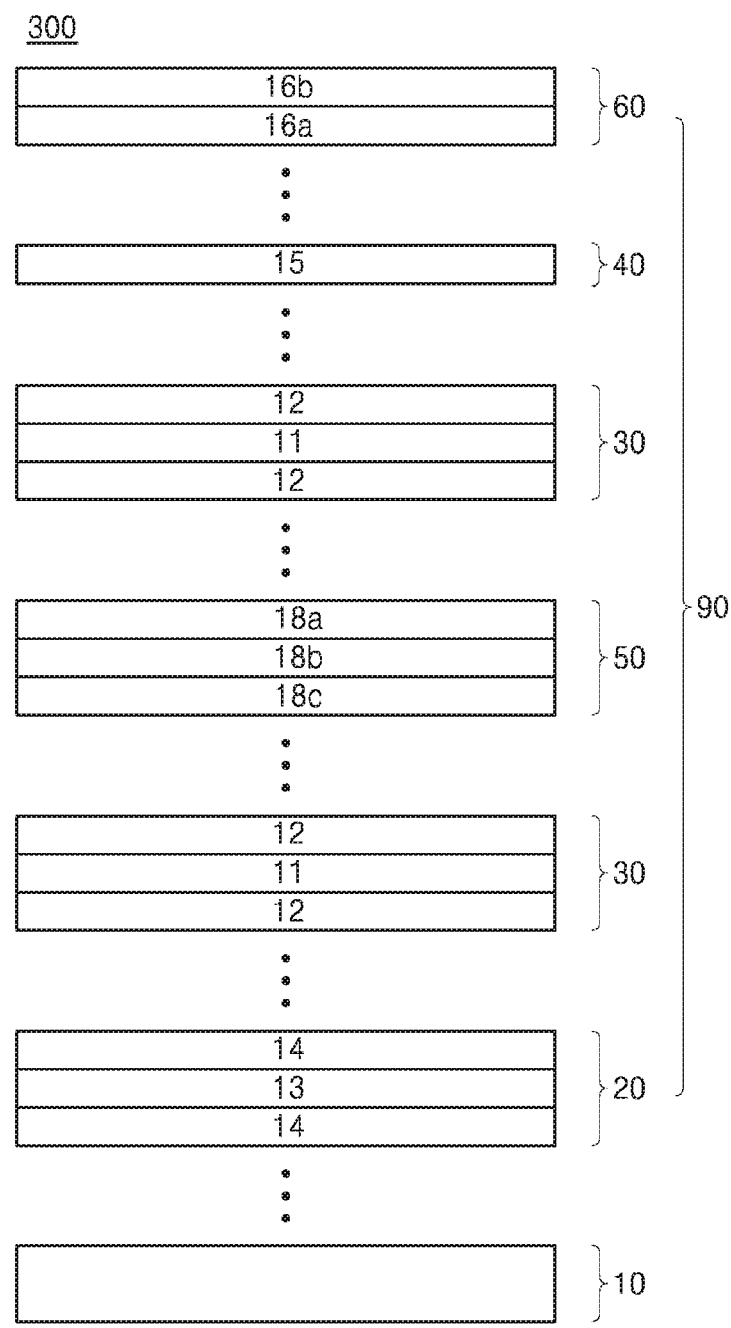
FIG. 3 is a schematic cross-sectional view of a functional building material for window in matte gray according to another embodiment of the present invention.

FIG. 3 shows a functional building material 300 for window in matte gray in accordance with another embodiment of the present invention. In FIG. 3, the matte gray functional building material for window comprises two low-emissivity regions 30, with an intermediate dielectric region 50 interposed therebetween.

The intermediate dielectric region 50 may include at least one intermediate dielectric layer 18a, 18b, & 18c.

The intermediate dielectric layers 18a, 18b, & 18c can function as an oxidation-resistant membrane of the low-emissivity layer 11 because the metal used as the low-emissivity layer 11 is generally oxidized, and the intermediate dielectric layers 18a, 18b, & 18c also serve to increase a visible light transmittance. Further, the optical performance of the low-emissivity coating 90 can be controlled by appropriately adjusting the materials and the physical properties of the intermediate dielectric layers 18a, 18b & 18c. It is possible to appropriately adjust the materials and the physical properties or the thickness of the intermediate dielectric layers 18a, 18b & 18c to help the functional building materials for window 100, 200 & 300 to be expressed in a predetermined matte gray.

The intermediate dielectric layers 18a, 18b, & 18c may be sequentially laminated with a single layer or a plurality of layers according to a desired use purpose, a desired color or a desired physical property to be implemented. Accordingly, the intermediate dielectric region 50 may be formed by continuously stacking the intermediate dielectric layers 18a, 18b, & 18c.

The intermediate dielectric layers 18a, 18b, & 18c may include various metal oxides, metal nitrides, metal oxynitrides, and the like, or a combination thereof. Alternatively, the intermediate dielectric layers 18a, 18b, & 18c may include materials in which the metal oxides or the metal nitrides described above are doped with at least one component selected from the group consisting of bismuth (Bi), boron (B), aluminum (Al), silicon (Si), magnesium (Mg), antimony (Sb), beryllium (Be) and a combination thereof, and it is possible to use any of the known materials available for protecting the low-emissivity layer 11 without being limited thereto.

For example, the intermediate dielectric layers 18a, 18b, & 18c may include at least one selected from the group consisting of titanium oxide, zinc tin oxide, zinc oxide, aluminum zinc oxide, tin oxide, bismuth oxide, silicon nitride, aluminum silicon nitride, and the like, and a combination thereof, but are not limited thereto.

The intermediate dielectric layers 18a, 18b, & 18c may be made of a dielectric material having a refractive index of about 1.5 to about 2.3. The thickness of the intermediate dielectric layers 18a, 18b & 18c can be adjusted to attain desired properties such as a transmittance, a transmittance and a reflective color, depending on the value of the refractive index.

The thickness of the intermediate dielectric region 50 may be, for example, from about 5 nm to about 90 nm. The thickness of the intermediate dielectric region 50 can be variously adjusted according to the position and material which are implemented in order to attain the optical properties (transmittance, reflectivity, color index, etc.) of all the multilayer thin films in compliance with the target performance. It is possible to effectively adjust the optical properties, including the intermediate dielectric region 50 having the range of the thickness defined above, and to realize an appropriate production speed.

The intermediate dielectric layers 18a, 18b, & 18c may be composed of a material having a light extinction coefficient close to zero. Since the extinction coefficient having greater than 0 means that the incident light is absorbed by the intermediate dielectric layers 18a, 18b, & 18c before reaching the low-emissivity layer 11, it is not preferable due to a factor that hinders the securing of a clear view. Therefore, the extinction coefficient of the intermediate dielectric layers 18a, 18b & 18c can have, for example, less than about 0.1 in the visible light range (wavelength range of about 380 nm to about 780 nm). As a result, the intermediate dielectric layers 18a, 18b, & 18c can provide clear view by ensuring excellent light-emitting property.

The upper dielectric region 40 includes an upper dielectric layer 15, and the detailed description of the upper dielectric layer 15 is the same as the description of the intermediate dielectric layers 18a, 18b, & 18c, as described above.

The upper dielectric region 40 may include at least one layer of the upper dielectric layer 15. The upper dielectric layer 15 may be a single layer or a plurality of layers laminated in succession, depending on desired uses, colors or physical properties to be implemented. Accordingly, the upper dielectric region 40 may comprise the upper dielectric layer 15 that is laminated sequentially.

The low-emissivity coating 90 may further comprise an outermost region 60 having at least one layer of overcoat layers 16a and 16b on the upper portion of the upper dielectric region 40.

The overcoat layers 16a and 16b are positioned at the outermost surface of the low-emissivity coating 90 to enhance durability while reinforcing mechanical strength.

The overcoat layers 16a and 16b may include at least one selected from the group comprising zirconium, an alloy containing zirconium such as silicon zirconium, a metal oxide, a metal nitride, a metal oxynitride, and a combination thereof, or include materials in which the zirconium, the alloy containing zirconium, the metal oxide, the metal nitride or the metal oxynitride is doped with at least one component selected from the group consisting of bismuth (Bi), boron (B), aluminum (Al), silicon (Si), magnesium (Mg), antimony (Sb), beryllium (Be), and a combination thereof.

The low-emissivity coating 90 may further comprise additional layers other than the structures described above to implement the desired optical properties.

The transparent glass substrate 10 may be a transparent substrate having a high visible light transmittance, and may be a glass or a transparent plastic substrate having a visible light transmittance of, for example, about 80% to about 100%. The transparent glass substrate 10 can include, for example, a glass used for construction without any limitation, and can be, for example, about 2 mm to about 12 mm in thickness, but is not limited thereto.

In order to manufacture the functional building materials for window 100 and 200, the transparent glass substrate 10 may be prepared first, and then each layer of the low-emissivity coating 90 may be formed sequentially. Each layer of the low-emissivity coating 90 may be formed using a suitable method to achieve the desired properties according to the known manner.

For example, each layer of the low-emissivity layer 11, the lower light-absorbing layer 13, the light-absorbing metal layer 12, the intermediate dielectric layers 18a, 18b, & 18c, and the upper dielectric layer 15 can be formed by the means such as a sputtering technology.

Hereinafter, Examples and Experimental examples according to the present invention will be described. These Examples are merely embodiments of the present invention, and the present invention is not limited to the Examples described below.

EXAMPLE

Example 1

Using a magnetron sputtering depositor (Selcos Cetus-S), a low-emissivity coating of a multiple layers coated on a transparent glass substrate was formed as follows to produce a matte gray functional building material for window. Table 1 below shows the layer structure of the matte gray functional building material for window produced above, according to the laminated order.

TABLE 1

| Classification | Layer | Material (parentheses: volume ratio) | Thickness |
|---|---|---|---|
| Outermost region | Overcoat layer | (The uppermost part of low-emissivity coating) SiAlOxNy (N$_2$:O$_2$ = 25:75) | 15 nm |
| | Overcoat layer | Zr (Ar 100 vol %) | 5 nm |
| Upper dielectric region | Upper dielectric layer | SiAlNx (Ar:N$_2$ = 45:55) | 20 nm |
| | Upper dielectric layer | ZnAlOx (Ar 100 vol %) | 2 nm |
| Low-emissivity region | Light-absorbing metal layer | NiCr (Ar 100 vol %) | 1 nm |
| | Low-emissivity layer | Ag (Ar 100 vol %) | 11 nm |
| | Light-absorbing metal layer | NiCr (Ar 100 vol %) | 1 nm |

TABLE 1-continued

| Classification | Layer | Material (parentheses: volume ratio) | Thickness |
|---|---|---|---|
| Intermediate dielectric region | Intermediate dielectric layer | ZnAlOx (Ar 100 vol %) | 1.5 nm |
| | Intermediate dielectric layer | SiAlNx (Ar:$N_2$ = 45:55) | 65 nm |
| | Intermediate dielectric layer | ZnAlOx (Ar 100 vol %) | 1.5 nm |
| Low-emissivity region | Light-absorbing metal layer | NiCr (Ar 100 vol %) | 1 nm |
| | Low-emissivity layer | Ag (Ar 100 vol %) | 10 nm |
| | Light-absorbing metal layer | NiCr (Ar 100 vol %) | 1 nm |
| Lower region | Lower dielectric layer | ZnAlOx (Ar 100 vol %) | 2 nm |
| | Lower dielectric layer | SiAlNx (Ar:$N_2$ = 40:60) | 15 nm |
| | Lower light-absorbing layer | CrNx (Ar:$N_2$ = 75:25) | 6 nm |
| | Lower dielectric layer | (The lowermost part of low-emissivity coating) SiAlNx (Ar:$N_2$ = 40:60) | 30 nm |
| Transparent glass substrate | | | 6 nm |

Experimental Example 1

Performance analysis of the functional building materials for window manufactured in Example 1 was carried out by the following items.
<Calculation of Transmittance and Reflectivity>
The optical spectrum was measured at a width of 1 nm in the range of 250 nm to 2500 nm using a UV-Vis-NIR spectrometer (Shimadzu, Solidspec-3700). Thereafter, a visible light transmittance, a reflectivity of the coated surface of the low-emissivity coating in the functional building material for window, and a reflectivity of the other surface, i.e., the surface toward the grass substrate, on which the low-emissivity coating in the functional building material for window is not formed, were calculated based on the resultant values in accordance with the KS L 2514 standard.
<Emissivity>
Far-infrared reflectivity spectrum on one surface coated with the low-emissivity coating of functional building materials for window were measured using a far-infrared spectrophotometer, FT-IR (Frontier, Perkin Elmer). Based on the result values, the average reflectivity of the far-infrared rays was calculated in accordance with the KS 2514 standard, and then the emissivity was evaluated by a formula of 100%−(average reflectivity of the far-infrared rays).
<Color Index>
The L*, a*, and b* values were measured according to the CIE 1931 standard using a color difference meter (KONICA MINOLTA SENSING, Inc., CM-700d). At this time, the light source was applied as D65 of the KS standard.

TABLE 2

| Classification | Example 1 |
|---|---|
| Emissivity, ε | 4.6 |
| Visible light transmittance, (%) | 48.6 |
| Reflectivity of glass surface, (%) | 4.4 |

TABLE 2-continued

| Classification | | Transmissive surface | Reflection of coated surface | Reflection of glass surface |
|---|---|---|---|---|
| Color index | L* | 75.2 | 26.4 | 25.1 |
| | a* | −2.7 | −11.8 | 0.8 |
| | b* | −1.7 | −20.7 | 0.0 |

It was confirmable from Table 2 that both the visible light transmittance and the reflectivity of the glass surface are low characteristics in Example 1. Further, both the color indexes a* and b* show the values close to 0 in both the transmissive surface and the reflection of glass surface, as can be seen from Example 1, thereby confirming the attainment of the neutral gray.

Experimental Example 2

For each of the functional building materials for window manufactured in Example 1, a 6 mm transparent glass separately prepared was interposed such that a spacer therebetween has a clearance of 12 mm, and a sealant was applied and adhered to the edges thereof to produce a double-layer glass. The low-emissivity coating of the functional building material for window manufactured by Example 1 in the above double-layer glass was attached so as to be disposed inside the clearance. The clearance was filled with 100 vol. % of Ar.

The visible light transmittance, the reflectivity of the glass surface, and the color index were measured for each of the double-layer glass manufactured using the functional building material for window of Example 1 according to the same measurement method as in Experimental example 1.

TABLE 3

| Classification | | Example 1 |
|---|---|---|
| Visible light transmittance, (%) | | 43.2 |
| Reflectivity of glass surface, (%) | | 6.4 |

| | | Transmissive surface | Reflection of coated surface | Reflection of glass surface |
|---|---|---|---|---|
| Color index | L* | 71.78 | 41.00 | 30.35 |
| | a* | −3.97 | −6.07 | −0.31 |
| | b* | −1.69 | −11.2 | −0.84 |

As a result consistent with Experimental example 1, the double-layer glass produced from Example 1 exhibited a low reflectivity with a low transmittance and a matte and neutral gray.

Experimental Example 3

In Experimental example 2, a spectroscopic spectrum was obtained using a UV-Vis-NIR spectrometer (Shimadzu, Solidspec-3700) for a double-layer glass manufactured using the functional building material for window of Example 1, and FT-IR (Frontier, Perkin Elmer) was used to obtain the emissivity, and the calculated SHGC value and Ug value were obtained using the results.

SHGC: 0.283

Ug (Uvalue): 1,372

SHGC is a solar heat gain coefficient (SHGC), which is the ratio of the energy delivered to the interior through window versus the energy that the solar heat enters window.

Solar Heat Gain=SHGC×Solar Radiation

The obtained SHGC value is a low value that achieves a predetermined target value, and is a value which can confirm that the level required by the functional building material for windows is sufficiently attained.

Ug (Uvalue) is a heat flow rate. The heat transfer through one portion of the building, such as a wall made up of several layers of different materials, takes place through several processes. The heat transfer rate through a structure made up of various materials is referred to as the heat flow rate, which is a value obtained by mixing all the factors. The unit of Ug (Uvalue) is $W/m^{2\circ}$ C. ($Kcal/m^2$ h ° C.) and is the value that the heat flow rate through a structure having a surface area of 1 m2 is measured in watts when the structure is interposed and the temperature difference therebetween is 1° C.

The lower the heat flow rate, the better the heating insulation performance. The obtained Ug (Uvalue) is a low value for achieving a predetermined target value, which can confirm that the heating insulation effect is sufficiently achieved at the level required by the functional building material for window.

While the invention has been shown and described with reference to certain preferred embodiments thereof, it is to be understood that the invention is not limited to the disclosed embodiments, but various changes and improvements of the constitutions defined in the following claims fall within the scope of the invention.

EXPLANATION OF REFERENCE NUMERALS

10: Transparent glass substrate
11: Low-emissivity layer
12: Light-absorbing metal layer
13: Lower-light absorbing layer
14: Lower dielectric layer
15: Upper dielectric layer
16a, 16b: Overcoat layer
18a, 18b, 18c: Intermediate dielectric layer
20: Lower region
30: Low-emissivity region
40: Upper dielectric region
50: Intermediate dielectric region
60: Outermost region
90: Low-emissivity coating
100, 200: Functional building materials for window

What is claimed is:

1. A functional building material for a window, comprising:
   a transparent glass substrate; and
   a low-emissivity coating on a first surface of the transparent glass substrate, wherein the low-emissivity coating comprises:
     a lower region in contact with the transparent glass substrate;
     two to three low-emissivity regions; and
     an upper dielectric region,
     wherein the lower region, the two to three low-emissivity regions, and the upper dielectric region are stacked sequentially in this order,
     wherein the lower region comprises:
       a first lower dielectric layer;
       a lower light-absorbing layer, wherein the lower light-absorbing layer comprises chromium nitride; and
       a second lower dielectric layer,
       wherein the first lower dielectric layer, the lower light-absorbing layer and the second lower dielectric layer are stacked sequentially in this order,
     wherein each low-emissivity region of the two to three low-emissivity regions comprises:
       a low-emissivity layer; and
       two light-absorbing metal layers on both sides of the low-emissivity layer,
     wherein each light-absorbing metal layer of the two light-absorbing metal layers comprises NiCr, and
     wherein the upper dielectric region comprises:
       a first upper dielectric layer comprising ZnAlOx, wherein the first upper dielectric layer is in contact with one light-absorbing metal layer of the two light-absorbing metal layers of one of the two to three low-emissivity regions; and
       a second upper dielectric layer comprising SiAlNx,
   wherein an intermediate dielectric region is interposed between any two of the two to three low-emissivity regions meets, and each of the intermediate dielectric region comprises:
     a first intermediate dielectric layer comprising ZnAlOx;
     a second intermediate dielectric layer comprising SiAlNx; and
     a third intermediate dielectric layer comprising ZnAlOx
     wherein the first intermediate dielectric layer, the second intermediate dielectric layer and the third intermediate dielectric layer are laminated sequentially in this order,
   wherein the functional building material has a color index a*value of −5 to 5 and a color index b*value of −5 to 5, which is measured using a colorimeter for visible light transmitting color, and
   wherein a second surface of the transparent glass substrate, on which the low-emissivity coating is not formed, has a color index a*value of −5 to 5 and a color index b*value of −5 to 5, which is measured using a colorimeter for reflected color,
   wherein the functional building material has a visible light transmittance of 20% to 60%,
   wherein the second surface of the transparent glass substrate, on which the low-emissivity coating is not formed, has a visible light reflectivity ranging from 1% to 7%, and wherein a color of the functional building material is matte gray.

2. The functional building material according to claim 1, wherein a thickness of the lower light-absorbing layer ranges from 1 nm to 15 nm.

3. The functional building material according to claim 1, wherein a thickness of the first lower dielectric layer or the second lower dielectric layer ranges from 10 nm to 40 nm.

4. The functional building material according to claim 1, wherein an emissivity of the low-emissivity layer ranges from 0.01 to 0.3.

5. The functional building material according to claim 1, wherein the low-emissivity layer includes at least one selected from the group consisting of Ag, Au, Cu, Al, Pt, ion-doped metal oxides, and a combination thereof.

6. The functional building material according to claim 1, wherein an extinction coefficient of each light-absorbing metal layer of the two light-absorbing metal layers in a visible light region ranges from 1.5 to 3.5.

7. The functional building material according to claim 1, wherein a thickness of each light-absorbing metal layer of the two light-absorbing metal layers ranges from 0.5 nm to 10 nm.

8. The functional building material according to claim 1, wherein a thickness of the low-emissivity layer ranges from 5 nm to 20 nm.

9. The functional building material according to claim 1, wherein a thickness of the intermediate dielectric region ranges from 5 nm to 90 nm.

10. The functional building material according to claim 1, wherein the low-emissivity coating further comprises an outermost region having at least one overcoat layer on an upper portion of the upper dielectric region.

11. The functional building material according to claim 10, wherein the overcoat layers include at least one selected from the group consisting of zirconium, an alloy containing zirconium, a metal oxide, a metal nitride, a metal oxynitride and a combination thereof, or include materials in which the zirconium, the alloy containing zirconium, the metal oxide, the metal nitride or the metal oxynitride is doped with at least one component selected from the group consisting of bismuth (Bi), boron (B), aluminum (Al), silicon (Si), magnesium (Mg), antimony (Sb), beryllium (Be) and a combination thereof.

12. The functional building material according to claim 10, wherein the overcoat layers include at least one selected from the group consisting of a titanium oxide, a zinc tin oxide, a zinc oxide, an aluminum zinc oxide, a tin oxide, a bismuth oxide, a silicon nitride, an aluminum silicon nitride, an aluminum silicon oxynitride, a tin silicon nitride and a combination thereof.

13. The functional building material according to claim 1, wherein the transparent glass substrate is a glass having a visible light transmittance of 80% to 100%.

* * * * *